TRAFFIC CONTROL SYSTEM

Filed June 16, 1947 4 Sheets-Sheet 1

INVENTOR.
MARCEL WALLACE
BY Hyman Hurvitz
ATTORNEY

INVENTOR.
MARCEL WALLACE

BY Hyman Hurvitz

ATTORNEY

INVENTOR.
MARCEL WALLACE
BY Hyman Hurwitz
ATTORNEY

INVENTOR.
MARCEL WALLACE
BY Hyman Hurvitz
ATTORNEY

Patented Dec. 23, 1952

2,623,208

UNITED STATES PATENT OFFICE 2,623,208

TRAFFIC CONTROL SYSTEM

Marcel Wallace, East Port Chester, Conn., assignor, by mesne assignments, of one-half to said Wallace, doing business as Panoramic Laboratories, East Port Chester, Conn.

Application June 16, 1947, Serial No. 754,942

16 Claims. (Cl. 343—6)

This invention relates generally to air traffic control systems, and more particularly to systems for providing at a central location continuous indications of navigational parameters associated with each of a plurality of aircraft.

Briefly described, the invention concerns itself with the utilization of omnidirectional beacon signals in conjunction with translating equipment aboard one or more aircraft, the translating equipment serving to transmute the beacon signals into signals representative of the altitude, range and bearing of each of the aircraft, and for transmitting the latter signals to a ground station for indication there of such altitude, range and bearing.

The present system involves fundamentally a transmission, from each of a plurality of aircraft, of a signal having a frequency determined in accordance with the altitude of the aircraft. Such signals may be interpreted at ground stations, in terms of altitude, as by means of suitably calibrated frequency scanning or panoramic receivers.

The factor which determines the total frequency band required for transmission of a given range of altitudes, in systems of the above character, is primarily the frequency stability of the transmitters and of the receiver utilized in the system, since frequency drifts either of transmitted frequencies or of receiver tuning are indistinguishable from frequency changes due to altitude variations of aircraft. In my previous systems, as exemplified in my application for U. S. Patent Serial Number 729,378, February 18, 1947, now Patent Number 2,565,008. I utilize independent oscillators at both receiver and transmitter, which are susceptible of drift for various reasons. In the system of the present application, on the other hand, I utilize a novel principle, to wit, I provide a common carrier or frequency which may be utilized by the various transmitters as well as by the receiver of the system as a frequency standard. The common carrier is transmitted from the ground station and is received aboard each of the aircraft, and retransmitted after having added thereto by heterodyn action a component of frequency which depends upon altitude. The added component of frequency is derived from a relatively low frequency oscillator, which is subjected to frequency control in accordance with aircraft altitude, and because of its low frequency drifting of the oscillator is of negligible magnitude when considered in relation to the frequency value of the altitude representative transmissions. At the ground receiver, which is of the superheterodyne type, the common carrier is utilized as a source of local oscillation so that the difference between (1) signals received and representative of altitude and (2) the locally supplied oscillation, depends only upon the frequency of the altitude representative low frequency oscillator, the total effect of frequency drifts being cancelled as between the receiver and the various transmitters except for such slight drifts as may occur in the altitude controlled oscillators. The latter, as has been pointed out hereinbefore, are of slight relative magnitude in the overall system.

While the system as so far described does not depend upon the specific source of common carrier which may be utilized, it is a feature of the invention to utilize transmissions derived from omni-directional beacons for such purpose, since such beacons will be in any event available at all air stations, in accordance with present regulations of the Civil Aeronautics Authority. But such utilization provides still a further advantage, which is not apparent at first blush, and appreciation of which requires consideration of the components and operation of the present standard omni-directional beacon system.

The omni-directional beacon system which is presently standard equipment under the regulations of the Civil Aeronautics Authority is well understood, and includes apparatus for transmitting an omni-directional pattern of radiation and a rotating pattern, the omni-directional pattern being amplitude modulated with a sub-carrier which is itself frequency modulated at a low frequency F. The rate of rotation of the rotating pattern corresponds with this low frequency F. Aboard each aircraft, therefore, are available two signals F, one of which has the same phase at every azimuthal bearing, but the other of which has a phase which is a direct function of azimuthal bearing, since it derives from the rotation of the rotating pattern. The bearings of aircraft may then be determined aboard such aircraft by a simple measurement of relative phase.

We now recall that the altitude representative transmissions from each of the aircraft are composited from received omni-directional beacon signal and from a further single frequency, representative of altitude, the composited signal being repeated to a ground station where its frequency value may be indicated or recorded on a panoramic or frequency scanning receiver.

The repeated or transponded signals, representative of altitude, contain the very signals which are inherent in the beacon transmissions, and which are utilized aboard the aircraft for bearing determination by phase comparison. These same signals may therefore be interpreted at the ground station in terms of the bearing of the signal repeating aircraft, by a process of phase comparison precisely analogous to that utilized aboard the aircraft.

In accordance with the description so far, we have seen that the omni-directional beacon signals provided by the ground station may be utilized aboard aircraft for bearing determinations, may serve as a common carrier for stabilizing or standardizing the frequencies of the overall system with which we are concerned, by utilization thereof as a major component of altitude representative signals repeated from the aircraft, and the repeated signals contain modulations which are susceptible of interpretation on the ground in terms of bearing of the aircraft.

Still a further possibility is envisaged, based upon the following known laws of electricity. When a signal is transmitted from one point and repeated back from a remote location to that point the relative phase of the signals as transmitted and received back at the one point is representative of signal transmission time. The same effect is found in respect to modulations of signal, and systems are known, accordingly, in which a modulated high frequency carrier is transmitted from a ground station to an aircraft and thence repeated to the ground station, where the phases of the modulation as transmitted and received are compared for purposes of deermination of range of the aircraft. By proper selection of the frequency of modulation various ranges may be efficiently measured, it being required generally, to avoid ambiguity, that the period of the modulation be greater than the maximum anticipated transmission time of the signals, so that phase comparison is effected between signals which have not changed phase by more than a single cycle in the course of transmission.

When the beacon transmissions are examined, in the present system, and as has been recited hereinbefore, a 10,000 cycle per second modulation is found present. This frequency readily lends itself to range determinations. Therefore, the very signals which, when received at the ground station after being repeated from the aircraft, enable determination of altitude and bearing of the aircraft, still further enable determination of range thereof by a simple phase comparison between the 10,000 cycle signal as transmitted by the beacon, and as received by the ground station after transponding via the aircraft.

It will be evident from the above discussion that the present system provides a maximum of navigational information for a minimum of equipment additionally to that which is in any event available and required to comply with regulations of the Civil Aeronautics Authority, and that the airborne equipment in particular is extremely simple, being represented merely by an altitude controlled transponder, and that the transponder requires no attention from the pilot in the performance of its functions.

At the ground station, of course, a bank of frequency and phase measuring equipments is required, so that transmissions from each of the aircraft may be analyzed and the resulting navigational information presented for visual inspection, a separate presentation being preferably provided for each aircraft. I realize that various types of indicating and/or recording systems may be utilized at the ground station, but I prefer to utilize a separate receiver at the ground station for each aircraft, each receiver being supplied with a phase comparator for range and a phase comparator for bearing, the comparators being utilized to control meters, which are calibrated in terms of range and bearing. The receivers may be of the frequency following types and may be locked to the altitude representative transmissions of selected aircraft. Altitudes, on the other hand, may be represented on a facsimile type recorder of the frequency scanning type, so that the altitudes of all craft may be commonly displayed on a single record receiving surface for ready comparison.

In operation, then, the altitudes of all aircraft adjacent to a beacon station, or an air station, may be continuously recorded on a time fed tape. A traffic control officer may scan the tape periodically and thereby keep accurate check on the altitudes of all aircraft. Should the traffic control officer desire azimuth and range information with respect to any specific aircraft, he has only to tune one of the indicating receivers to the altitude frequency of that aircraft, and read the indicating meters to derive the desired information. Once a receiver has been tuned to the altitude frequency of a selected aircraft, it remains tuned to that aircraft despite changes in altitude thereof, and thereby automatically provides a continuous indication of the navigational parameters of that aircraft so long as the traffic control officer may desire.

It should be realized that the system as above briefly described does not require, specifically, a beacon station, nor a beacon station of the type now approved by the Civil Aeronautics Authority. Nor need all phases of the system be utilized simultaneously. So, if one is interested in altitude determinations only, a reference carrier may be supplied from the ground independently of any beacon systems, for use in accordance with my invention. Should it be desired to determine bearing, the ground carrier may be modulated with bearing representative signals of any desired type known to the beaconry art, so only that they are susceptible of being transponded and of being interpreted in terms of bearing after being transponded. Likewise, if range determinations are desired any steady modulation of suitable frequency may be imposed on the altitude representative carrier, and range may be determined by a simple phase measurement as between the modulation as transmitted and the modulation as received at the ground station after being transponded.

I have disclosed my invention in terms of one specific mode of application thereof, to wit, as applied in connection with the Civil Aeronautics Authority approved beacon system, not because the invention requires that system, but merely as one practical, and for many purposes preferred, mode of application of the invention.

I realize that the CAA system may, with advantage, be modified, for correlation with my invention, as by selection of a more advantageous frequency for range determination than is afforded by the present 10,000 cycle per second signal, or by imposition on the beacon carrier of a special unmodulated signal, say at 2500 or 3000 cycles per second, the sole function of which may be to enable range determinations.

I consider the above suggestions and modifications to arise naturally and without the exercise of the inventive faculty, from my basic invention as herein disclosed.

In accordance with the above it is a primary object of my invention to provide an improved navigational and telemetric system for aircraft.

It is a further object of the present invention to provide a telemetric system for transmitting altitude representative frequency from each of a plurality of aircraft and for receiving and translating such signals at a central location, wherein the receiving and translating equipment as well as the various airborne transmitting equipment, are stabilized from a single signal common thereto.

It is still a further object of the present invention to provide a system for transmitting a signal from a ground station which has a phase relative to a reference signal which depends upon the azimuthal bearing of a receiving station relative to the ground station and for transponding the signal from the receiving station to the ground station to enable determination of the said azimuthal bearing.

It is another object of the present invention to provide a system for providing a carrier at an altitude representative frequency for transponding the azimuthal bearing representative signal, referred to in the previous paragraph.

It is still another object of the invention to provide a system of altitude and range determination for aircraft wherein a signal is transmitted from a predetermined geographical location to one or more aircraft, and wherein each aircraft transponds the said signal to the predetermined location in terms of a modulation on a carrier at an altitude representative frequency, range being determinable by comparison of the phase of the signal as received after being transponded, and as transmitted.

It is still a further object of the invention to provide a system for transponding from an aircraft modulations derived from beacon signals, for determination at a remote point of the characteristics of the beacon signals as transponded and for interpretation of those characteristics in terms of range and bearing of the transponding aircraft.

Still a further object of the invention resides in the provision of a navigational system which utilizes a common carrier as a primary frequency stabilizing element, and wherein further, the frequency of the common carrier is modified in accordance with the value of a telemetric quantity.

Another object of the invention resides in the provision of a telemetric system wherein a common carrier is supplied to frequency stabilize the elements of the system, including a plurality of telemetric transmitters and a common receiver therefor, and wherein the frequencies of the transmitters are caused to depart from the frequency of the common carrier in accordance with the value of a telemetric quantity.

Still another object of the present invention resides in the provision of a telemetric system wherein a common carrier is supplied to frequency stabilize the elements of the system, that common carrier being modulated with signals which when received at a remote location have acquired distinguishing characteristics depending upon the location of the remote location with respect to the point of origin of the common carrier, and wherein the common carrier is frequency translated at the remote location in accordance with the value of a telemetric quantity substantially without disturbance to the distinguishing characteristics, and is then retransmitted to a signal analyzing station for analysis and indication of the value of the telemetric quantity and of the distinguishing characteristics.

The above and still further objects, advantages and features of the present invention will become apparent upon consideration of the following detailed description of one specific embodiment of the invention, especially when taken in conjunction with the appended drawings, wherein.

Referring now more particularly to the drawings, I describe an embodiment of an airborne equipment in accordance with the present invention.

Figure 1:
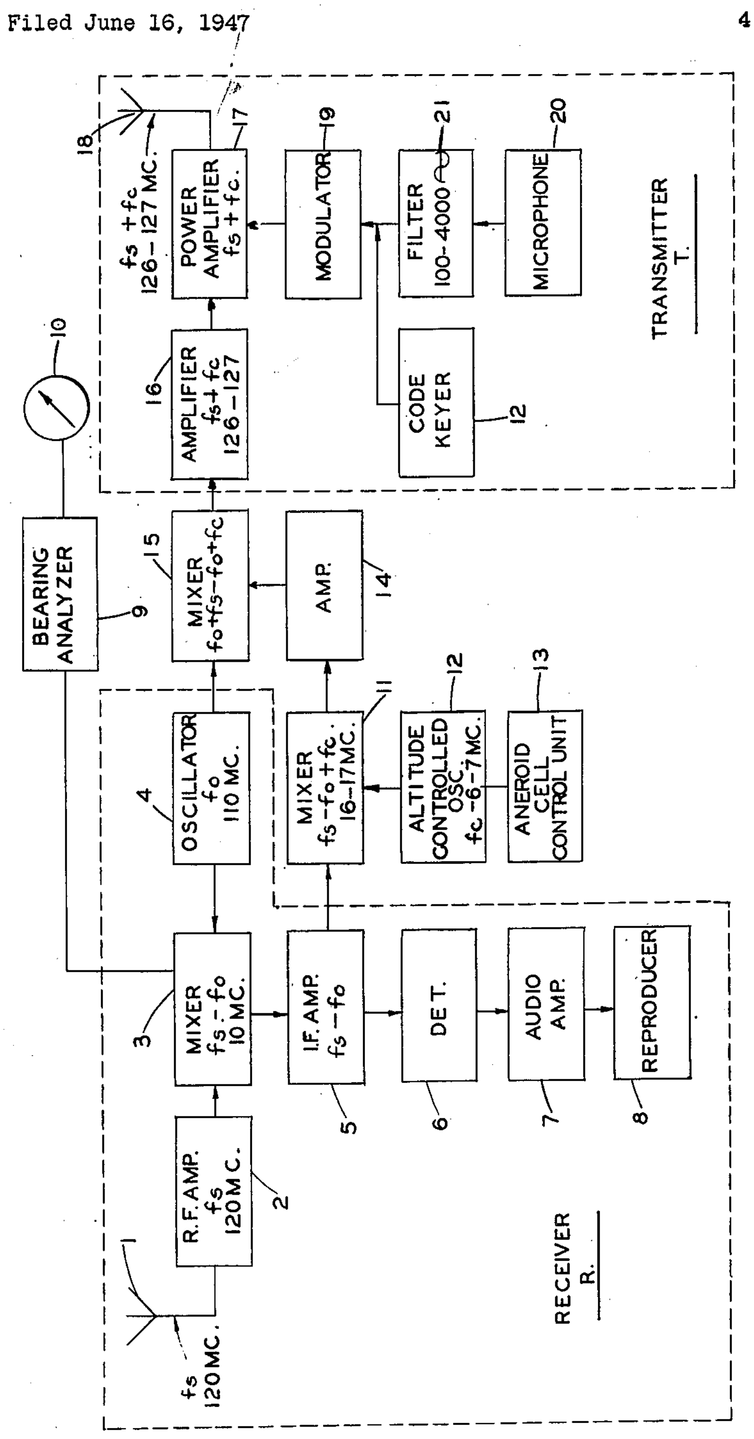
Figure 1 is a functional block diagram of a telemetric transponder constructed in accordance with the present invention.

Referring particularly to Figure 1 there is shown an antenna 1 which supplies signals to a radio frequency amplifier 2. Since signals received by antenna 1 derive from a ground beacon station the antenna 1 and the amplifier 2 are designed to be relatively broad band, and capable of handling any signal which may be encountered in a given omni-directional beacon system. At the present time such signals may be found in the range 115–125 mc., and I have selected, for the purpose of example, a representative frequency of 120 mc., as the input signal $fs$, to the amplifier 2, the system operating identically, however, for any other desired frequency.

The output of amplifier 2 is applied to a mixer 3, to which is also applied the output of an oscillator 4, which provides a frequency $fo$, which in my present example equals 110 mc. The difference frequency between $fs$ and $fo$ is derived from the mixer 3 by means of I. F. amplifier 5, operating at a frequency of $fs-fo$ or 10 mc., and the output of amplifier 5 may be detected in a detector 6, the detected audio output amplified in an audio amplifier 7, and the output of the latter applied to a reproducer 8, such as a speaker or phones.

The elements 1–8 inclusive together comprise, therefore, a conventional superheterodyne type receiver R which is available for receiving signals over the phone channel which forms part of every omni-directional beacon, and as will appear hereinafter.

The output of the mixer 3 may be further applied to a bearing analyzer 9, which supplies an output current dependent on the relative phases of two modulation signals Fc and Fp, derivable from the omni-directional beacon signals, the meter 10 serving to measure the output current, and hence being calibratable in terms of azimuthal bearing.

The output of the I. F. amplifier 5 may be further supplied to a mixer 11, to which is also supplied a signal deriving from a tunable oscillator 12, the output frequency of which is controlled in accordance with an altitude measurement provided by an aneroid cell 13, in known manner. The frequency $fc$ of the altitude controlled oscillator 12 may be selected of relatively low value, when compared to $fs$ or $fo$, and may be caused to vary over a relatively slight range in response to the aneroid cell control unit 13. For purposes of exemplification only, I have suggested a value of $fc$=6–7 mc., the value 6 mc. corresponding with zero altitude, or altitude at sea level under standard conditions of atmospheric pressure, and the value 7 mc. corresponding with an altitude of 10,000 ft. under the same standard conditions. An amplifier 14 is coupled to the output of the mixer 11, which serves to derive from the mixer a signal at frequency $fs-fo+fc$, or the sum of the frequency present in the I. F. amplifier 5 and that generated by the oscillator 12, and that signal represents in respect to its frequency the altitude measured by the aneroid cell 13.

The output of the amplifier 14 is applied in turn to a mixer 15, to which is also applied signal deriving from oscillator 4, so that the output of mixer 15, as selected by tuned amplifier 16 equals $fo+fs-fo+fc=fs+fc$.

It will be obvious then that the effect of the frequency $fo$ on the output of the mixer 15 has been completely eliminated, and that the amplifier 16 carries a signal which is a composite of the beacon frequency $fs$ and the altitude representative frequency $fc$, and may vary between the limits 126–127 mc. in accordance with the exemplary frequency values which I have adopted for purposes of discussion.

The frequency $fs+fc$ may be applied to a power amplifier 17 for transmission over an antenna 18.

The power amplifier 17 may have associated therewith a modulator 19, which may be supplied with speech currents deriving from a microphone 20, over a filter 21, which serves to pass only speech frequencies in the band 100–4000 cycles, to avoid interference with other functions of the equipment, to be described hereinafter. The elements 16–21 inclusive comprehend a relatively conventional speech transmitter T. There is accordingly required only the elements 11–15, for addition to a beacon receiver for receiving voice communication and bearing, and to a standard communication transmitter, in order to accomplish transmissions at frequencies controlled in accordance with altitude, and to so stabilize those frequencies that a relatively narrow range of frequencies serves for transmission of a wide range of altitudes, frequency drifts of the altitude representative signals being rendered negligible in the overall picture, by virtue of the stabilized value of the frequency $fs$ and of the relatively small frequency selected for $fc$. Relatively great drifts of $fc$, accordingly, impose but a small percentage change in $fs+fc$.

Further, since all aircraft utilizing the present system and flying in the vicinity of the same beacon, utilize the identical value of $fs$, any drifts of $fs$ are common to the entire system and do not introduce errors in relative altitude as between any plurality of aircraft of the system.

The modulator 19 may be supplied with coded transmission interrupting voltages, from a code keyer 22, which serves to interrupt transmissions from power amplifier 17 at relatively infrequent intervals, for relatively short time periods, in coded rhythm, a different code being assigned to all aircraft utilizing the system, and the coding providing a mode of identification of the transmitting aircraft.

Figure 2:
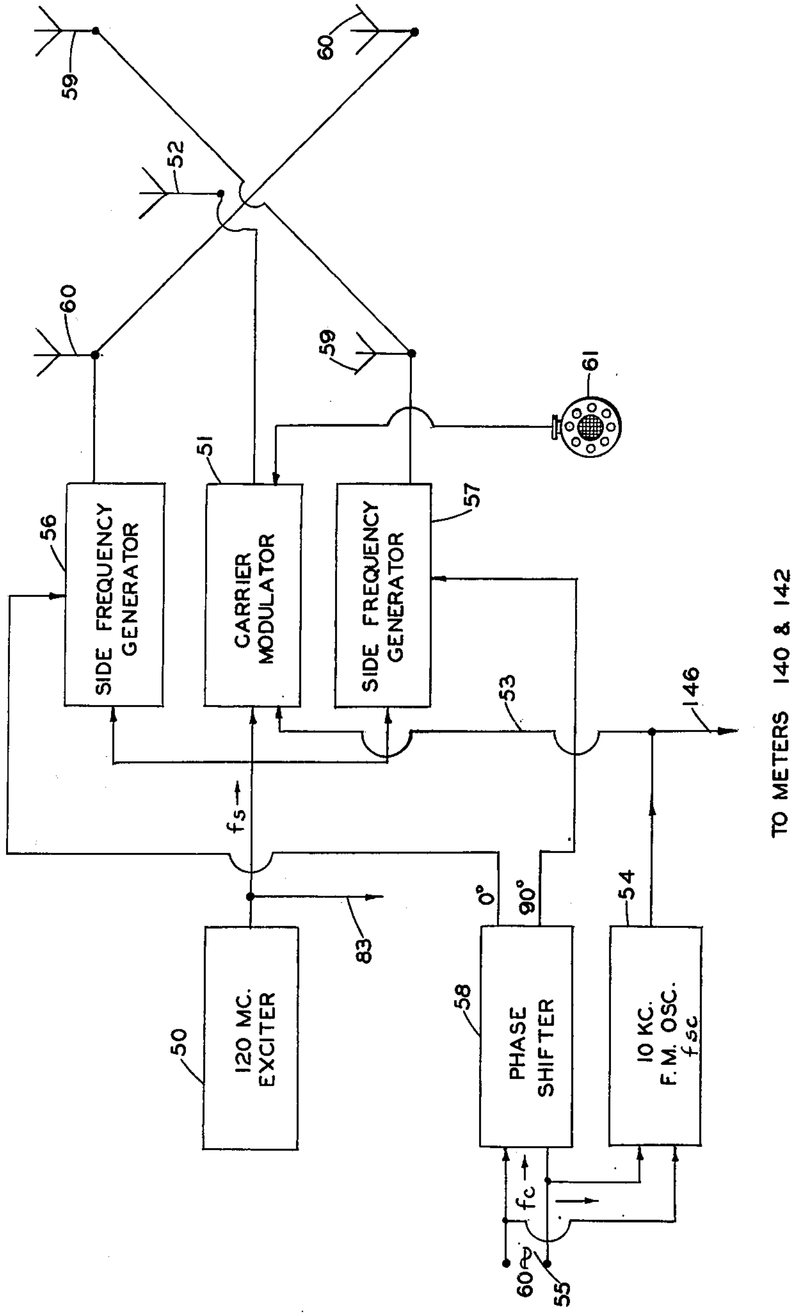
Figure 2 is a functional block diagram of an omni-directional beacon system as presently approved by the Civil Aeronautics Authority.

Reference is now made to Figure 2 wherein is illustrated in functional block diagram the standard C. A. A. approved V. H. F. omni-directional beacon, a clear understanding of which is requisite to further understanding of the present invention. The exciter 50 represents a transmitter, which operates at the frequency $fs$, referred to in connection with the description of the embodiments of the invention illustrated in Figure 1 of the accompanying drawings, and which, for the sake of providing actual values, has been assumed to equal 120 mc. The carrier provided by the exciter 50 is applied to a modulator 51, and thence to an omni-directional antenna 52. The modulator 51 is supplied with energy, over a lead 53, from a source of 10 kc. energy 54 ($Fsc$) which is in turn modulated in frequency at a 60 cycle rate ($Fc$) from a source of 60 cycle energy 55 The carrier radiated by the antenna 52, therefore, at frequency $fs$, is modulated so as to make available to suitable receivers a 60 cycle reference signal ($Fc$).

The output of the exciter 50 is further supplied to a pair of side frequency generators 56 and 57, respectively. The generator 56 when supplied with modulation frequency, say at 60 cycles per second, provides side bands only, formed by the coaction of the carrier $fs$ and the modulation. The generator 57 also provides side band energy only. Modulation is supplied to the side frequency generators 56 and 57 from the source 55, over a phase splitter 58, which provides two 60 cycle per second modulations differing in phase by 90°, one of which is supplied to the generator 56 and the other to the generator 57. The generators 56 and 57, respectively, feed a pair of antenna arrays, crossed at right angles to each other, one array comprising the pair of antennas 59, and the other array the pair of antennas 60.

By virtue of the angular space relationship between the arrays 59 and 60, and further by virtue of the 90° phase disparity between the modulations of the carriers supplied to the arrays, respectively, a rotating field of radiant energy is provided, which rotates at the rate of 60 revolutions per second, and which when combined with the omni-directional radiation of antenna 52, provides a rotating cardioid configuration of radiant energy.

Any receiver in the field of the antennas 59, 60 and 52 is therefore supplied with a carrier having a 10,000 cycle per second sub-carrier ($Fsc$) impressed thereon, which is in turn modulated by a 60 cycle per second signal ($Fc$), and the latter when finally abstracted by suitable demodulation processes from the carrier, has a fixed phase for all azimuthal positions of the receiver. The receiver also receives a signal ($Fp$) due to the rotating cardioid which, at the receiver, varies in intensity at a 60 cycle per second rate, due to the rotation of the cardioid pattern relative to the receiver, the phase of the signal when received being a function of the azimuthal position of the receiver. By comparison, then, of the phase of the reference signal ($Fc$) derived from the 10,000 cycle carrier, with that of the 60 cycle signal ($Fp$) of variable phase, a measure of azimuth may be provided. The required detection, analysis and phase comparison is accomplished by the bearing analyzer 9 and bearing is indicated aboard each aircraft by a suitably calibrated meter 10 (Figure 1), in a manner which need not concern us at this point.

The carrier supplied by the antenna 52 may be further modulated by impressing on amplitude modulator 51 voice signals from a microphone 61, the voice signals having no components at 30 cycles per second or less, nor adjacent to 10,000 cycles per second, so that possible interference with the beaconing functions of the equipment will not occur.

The voice signals referred to are detected by detector 6 (Figure 1) and reproduced in reproducer 8 (Figure 1).

The details of the beacon system forms no part of the present invention, and such beacons are in actual use at the present time, and have been widely described in the literature. So far as concerns Letters Patent of the United States, closely analogous systems are found in Byrne #2,252,699 and Byrne #2,313,048. It therefore appears superfluous to extend the discussion of the omni-directional beacon, per se. It will, however, be realized that the signal $fs$, as received by antenna 1 of Figure 1, will contain the modulations required for determination of azimuth, and that, therefore, the transmitted frequency $Fs$ and $fo$ (Figure 1) will also contain the same modulations.

The signals $fs+fc$, which is at a basic frequency representative of aircraft's altitude, is also modulated with signals representative of aircraft's azimuthal bearing relative to an omni-directional beacon, since the signal $fs+fc$ contains the carrier $fs$, as received and complete with its modulations. It is, therefore, possible to provide a receiver at a ground station which may be tuned to the frequency $fs+fc$, the value of the tuning providing a measure of altitude of the craft providing the signal $fs+fc$, and to provide in connection with the receiver a bearing analyzer, or a modulation analyzer, similar to 9, 10 (Figure 1), to provide readings of the azimuthal bearing of the transponding aircraft.

The above does not exhaust the possibilities of the present invention. I have identified the reference modulation at 60 cycles per second, which is omni-directionally transmitted, by the symbol $Fc$. The 10,000 sub-carrier upon which is imposed $Fc$ has been designated $Fsc$. The signal utilized for azimuthal rotation of the radiated pattern, at 60 C. P. S. has been designated $Fp$. It will then be realized that the signal $Fsc$ has a phase which may be arbitrarily designated $\theta$ when transmitted, and a phase $\theta+\phi$ when received at antenna 1 (Figure 1), and that, assuming negligible time consumed in traversing the system of Figure 1 from antenna 1 to antenna 18, the signal $Fsc$ will be received at the ground station, with a phase $\theta+2\phi$. The time consumed by signal $Fsc$ in changing phase by $2\phi$ radians may be measured at the ground by a simple phase comparison process, and provides a measure of transmission time of electro-magnetic energy from the ground station to the antenna and return. So, energy at 10,000 C. P. S. requires $1/10000$ second to complete a change of phase $2\phi$ radians which equals 100 microseconds. This allows distance measurements to about ten miles. Therefore, the present system provides the possibility of determining range, by a simple measurement of phase, to a distance of 10 miles, without any modification of the primary beacon system. One obstacle to such determination might, at first blush, seem insuperable, and that is the fact that the frequency $Fsc$ is in fact frequency modulated and hence presents no definite phase over a period of time. This obstacle is in fact easily overcome by filtering the signal $Fsc$ through a very narrow band pass filter, which removes all side-bands therefrom, leaving a pure 10,000 cycle tone available for phase comparison.

Figure 3:
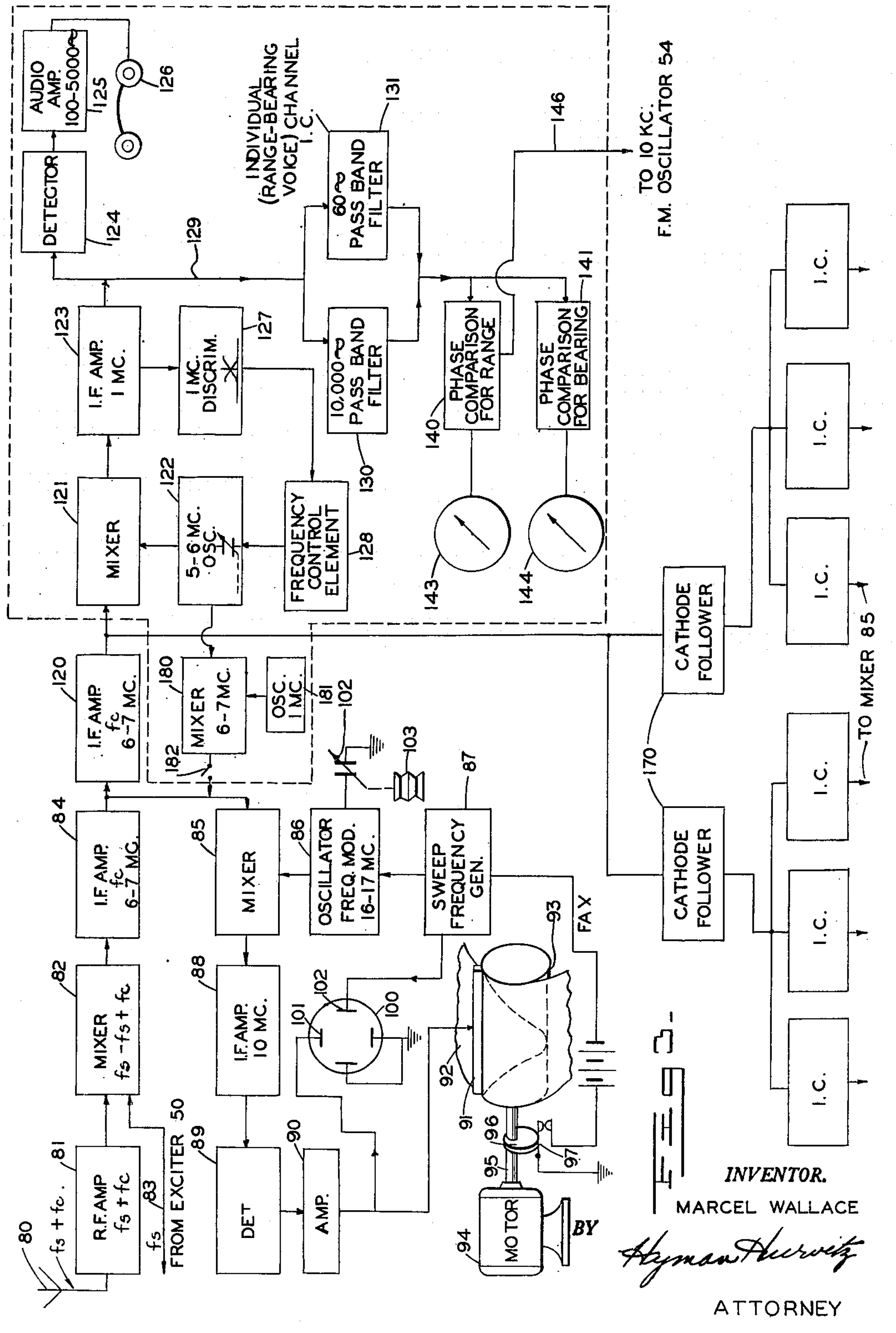
Figure 3 is a functional block diagram of a central receiving, recording and indicating station for translating signals provided by the telemetric transmitters of Figure 1.

Reference is now made to Figure 3 of the drawings, for illustration of an altitude indicating and recording system. An antenna, denoted by the reference numeral 80, is provided for receiving from aircraft signals which are representative of altitudes. The signals intercepted by the antenna 80 are amplified in an amplifier 81, having a band pass adequate for the entire altitude representative spectrum, and thence applied to a mixer 82, to which is also applied the frequency $fs$, which may be derived directly from the exciter 50 (Figure 3), over a cable 83. I have therefore applied to the mixer 82 a series of frequencies $fs+fc$, deriving from a plurality of aircraft, and a frequency $fs$. To the output of the mixer 82 is coupled an I. F. amplifier 84, capable of passing the band of frequencies represented by $fc$, i. e. 1 mc. wide, in the present example, and extending from 6–7 mc.

It will be clear that since the frequency $fs$ was added to the altitude varying frequency $fc$ at the transmitters of the system and is now subtracted from the transmitted signals at frequency $fs+fc$, that the effect of frequency drifts of the signal $fs$ has been completely eliminated from the present system.

The output of I. F. amplifier 84, consisting of signals in the band 6–7 mc. is applied to a mixer 85, for heterodyning with the output of a frequency swept oscillator 86, which includes a frequency modulator of the reactance tube type, the latter being controlled in response to periodic sweep voltages provided by a sweep voltage generator 87. The oscillator 86 may be caused, for example, to sweep the band 16–17 mc. periodically, whence by heterodyne action with the output of I. F. amplifier 84, a 10 mc. I. F. signal is provided which may be amplified in the narrow band amplifier 88, such signal being provided whenever in the excursion of the oscillator 86 over the band 16–17 mc. a signal is encountered in the output of amplifier 84 which differs from the then instantaneous frequency of oscillator 86 by precisely 10 mc. The output of I. F. amplifier 88 is applied to a detector 89, which provides signal output signals to an amplifier 90, the latter signal being applied to the marker electrode 91 of a facsimile type recorder FAX, to provide markings on a record receiving surface 92. The helical platen 93 of the recorder FAX is driven continuously by means of a motor 94, causing the potential marking position of the recorder periodically to scan laterally of the surface 92, a mark being made in response to each signal applied to the marker electrode by virtue of passage of current from the electrode 92 to the helical platen 93, via the record receiving surface 92.

The shaft 95 on which is mounted the platen 93 is secured a cam 96 which momentarily closes a circuit marker 97 once for each revolution of the shaft, and at a time such that the intersection of marker electrode 91 and helical element 93 intersect at a point laterally of the record receiving surface 92 which corresponds with a zero calibration line 98 extend longitudinally of the surface 92 adjacent to and parallel to one edge thereof.

Closure of circuit maker 97 provides a synchronizing signal for the sweep frequency generator 87, which may be, for example, a relaxation oscillator, so that the voltage generated thereby, and therefore the frequency variations of the frequency modulated oscillator 86, may be synchronized and coordinated with the scanning action of the helical platen of the recorder FAX.

Additionally to the recorder FAX is provided a cathode ray tube indicator 100, having vertical deflection plates 101 and horizontal deflection plates 102, the plates 101 being connected to the output of the amplifier 90 and the plates 102 being connected to receive output voltage from the generator 87.

It will be clear, with the arrangement as described, that the band of altitude representative signals in the spectrum 6–7 mc. will be explored periodically for the presence of altitude representative signals, in a manner common and well known in the art of panoramic reception, and that for each frequency in the spectrum will correspond a lateral position of the beam of a cathode ray tube indicator 100 and a recording position of the facsimile recorder FAX laterally of the record receiving surface 92. Discovery of an altitude representative signal results in impression of a voltage on the vertical plate 101 of the cathode ray indicator 100 and on the marker electrode 91 of the recorder, resulting in a vertical deflection of the cathode ray indication at a lateral position corresponding with the received altitude representative frequency, and resulting at the recorder in a permanent mark at a position laterally of the record receiving surface which corresponds with the received altitude representative frequency. The record receiving surface 92 is time fed, so that, in the course of the operation of the system a series of continuous recordings is provided each representing a time record of the altitude of an aircraft.

Coded interruptions of transmissions from the various aircraft, as provided by coder 12 (Figure 1), result in coded interruptions in the time records, from which the individual records may be identified as originating from specific aircraft, and the record receiving surface 92 may be precalibrated in terms of altitude, as may be also the face of the oscilloscope 100, to provide a reference with respect to which indications may be interpreted.

Since the measurements of altitude as provided by the aneroid cells aboard the various aircraft provide, in actuality, measurements of local atmospheric pressure and since they are precalibrated for standard conditions of pressure, it is necessary to effect compensation at the ground indicator and recorder for variations of local atmospheric pressure from standard. This is accomplished by varying the minimum or zero altitude frequency of the oscillator 86 by means of a trimmer condenser 102, which serves to vary slightly the tuning of oscillator 86, in response to mechanical control by an aneroid cell 103. Thereby, the minimum frequency of oscillator 86, which under standard conditions of atmospheric pressure may be 16 mc. may be varied in direct proportion to changes in atmospheric pressure to precisely the same extent as are the airborne aneroid cells 13, and complete compensation of indications is effected by virtue of the similar variations of tuning in response to variations of atmospheric pressure, which occur at the ground and aboard the various aircraft of the system.

The signal provided by the I. F. amplifier 84 may be amplified further by an I. F. stage 120 which supplies signals to a mixer 121 where it is heterodyned with a further signal supplied by a local oscillator 122, the output of the mixer 121 being applied to a narrow band or voice channel I. F. amplifier 123. The oscillator 122 may be manually tunable over a range sufficient to enable selection for any signal occuring in the band 6–7 mc., and representative of the altitude of an aircraft, for transfer to the amplifier 123, and by arranging the response of the amplifier 123 to be sufficiently narrow, resolution may be accomplished between signals representative of aircraft at closely adjacent altitudes. So, for example, the oscillator 122 may be tunable over the band of frequencies 5–6 mc. inclusive, and amplifier 123 may be tuned sharply to a frequency of 1 mc. If then, the pass band of amplifier 123 is 1,000 C. P. S. wide, or .25% of the total pass band, signals may be resolved from aircraft which are separated from other aircraft by a factor of .1% of the total altitude which is monitored in the present system. If that total altitude be taken to be 10,000 ft. resolution to within about 100 ft. may be effected. For a pass-band of 5000 cycles in amplifier 123, resolution to 50 ft. may be effected, but such a narrow pass band would, of course, exclude the frequency $F_{sc}$, as presently selected.

The signal selected by tuning of oscillator 122 may, after amplification in I. F. amplifier 123, be detected in a detector 124, amplified in audio amplifier 125 and applied to phones or the like 126 for aural presentation.

The output of the I. F. amplifier 123 may be applied, further, to a discriminator 127, tuned to the mid frequency of the I. F. amplifier 123, and which provides control voltage to a frequency control element 128, which controls the oscillator 127, maintaining its frequency such that any signal, once tuned in by hand to provide a response in I. F. amplifier 123, is maintained tuned in by the automatic frequency control action of the discriminator 127 and the frequency control element 128. The specific character of the A. F. C. system utilized in the present invention is not of importance, and any system known in the prior art may be utilized, including those which operate wholly electronically, and those in which control is effected mechanically by means of a reversible tuning motor controlled by means of a polarized relay, or the like. Specific examples of systems which I may utilize are disclosed in U. S. patent to M. Wallace, No. 1,878,737.

Suffice it to state, for the purposes of the present application for U. S. patent that the elements 121, 122, 123, 127, 128 act precisely as a conventional superheterodyne receiver which is subject to automatic frequency control, to maintain itself tuned to a selected signal despite frequency variations of that signal.

If, now, we assume that the elements 121, 122, 123, 127, 128 maintain conversion of any selected signal deriving from the I. F. amplifier 123, it will be clear that once the oscillator 122 has been manually tuned to accomplish reception of signals from an aircraft at a given altitude, reception of signals from that aircraft will continue despite changes in that altitude, and that signals from aircraft flying at altitudes which are slightly different from the selected altitude will not be received.

It will be recalled that the signal received by the antenna 80, and which after being converted in frequency is present in the output of I. F. amplifier 123, contains a modulation $F_{sc}$ at 10,000 cycles per second, $F_c$, and also by a 60 cycle per second amplitude modulation, $F_p$, which has a phase which is a function of the azimuthal bearing of antenna 80 with respect to an omni-directional beacon transmitter (Figure 2). This signal is applied over a lead 129, to a pair of band-pass filters 130 and 131, in parallel, the filter 130 passing the 10,000 cycle per second signal Fsc and being sufficiently narrow just barely to pass modulations of that signal. The band-pass filter 131, on the other hand, passes only 30 C. P. S. signal and excludes any voice modulation components otherwise present in I. F. amplifier 123. Use of filters 130 and 131 therefore assures that the minimum of extraneous effects will be present in the signals required for measurement of range and bearing, and while perhaps superfluous theoretically, actually are of considerable value in improving the accuracy and steadiness of indications provided by the present system.

At the output of the filters 130 and 131 are connected in parallel a plurality of measuring devices 140 and 141 and meter type indicators 143, 144, one of the latter being connected to the output of each of the measuring devices.

The device 141 and its associated meter 144 are precisely similar to the respectively corresponding elements 9 and 10 (Figure 1) and will be described in detail hereinafter in conjunction with Figure 4 of the drawings. Briefly described the elements 141 and 9 (Figure 1) include circuit elements for abstracting from the frequency modulated signal Fsc, its 60 cycle per second modulation Fc, for comparing the phase of that modulation with the phase of an azimuth corresponding 60 cycle per second signal Fp, and for indicating the value of the phase relation by means of meter 144 against a scale calibrated in terms of angular bearing.

The device 140 is a phase comparison device which includes a pair of extremely narrow-band filters tuned to 10,000 cycles and capable of excluding modulation of the 10,000 C. P. S. signal Fsc, i. e. having an effective pass-band of not more than 100 cycles. The signal Fsc is supplied to the phase comparison device 140 both from the I. F. amplifier 123, over lead 129, and from the oscillator 54 (Figure 1) over lead 146, and the result of the phase comparison is indicated on the meter 143, which is calibrated in range, the scale reading from 0 to 10 miles.

Figure 4:
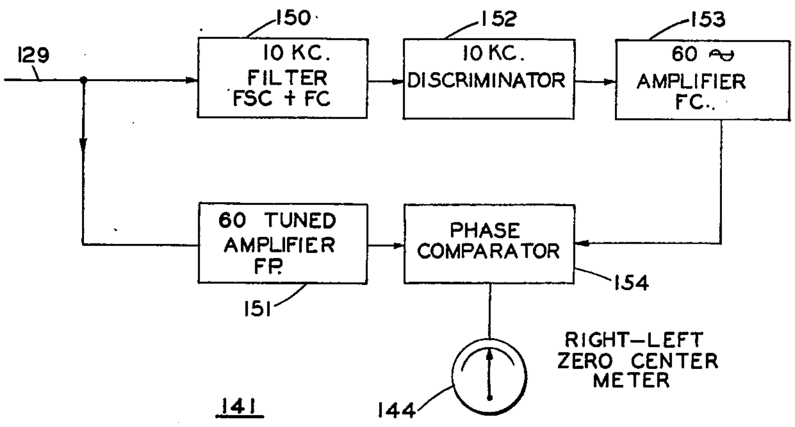
Figure 4 is a functional block diagram of a phase comparison system for bearing as utilized in the present invention.

Referring now to the drawings, and particularly to Figure 4 thereof, there is illustrated a bearing analysis system which corresponds with element 141 of Figure 3. Input signals for the device are provided over a lead 129, which provides signal deriving from the output of I. F. amplifier 123 (Figure 3) and including a 10 kc. sub-carrier Fsc frequency modulated at 60 cycles Fc, the phase of which is omni-directionally constant, and also the signal Fp, which is a 60 cycle per second signal having a phase depending on the azimuthal bearing with respect to antenna system 52, 59, 60 (Figure 2) at which is located receiver R (Figure 1.)

The signals Fsc and Fp are separated by a pair of filters 150 and 151, connected in parallel to the lead 129, the filter 150 being sufficiently broad to pass signal Fsc with its modulation and the filter 151 comprising an amplifier tuned to the frequency Fp.

The output of the filter 150 is applied to a discriminator 152, tuned to the frequency Fsc, and which abstracts therefrom the modulation signal Fc, applying that signal over an amplifier 153, tuned to the frequency Fc, to a phase comparator 154. The output of amplifier 151 is likewise applied to the phase comparator 154, and the output of the comparator then has a magnitude and a sense dependent on the phase relation of the signals Fc and Fp. The output of the comparator 154 may be measured on a meter 144, which may be of the type which provides right and left readings with respect to center in accordance with the magnitude and sense of the voltage or current applied thereto.

The bearing analyzing system 141 is in no sense my invention, but is per se well known, and has been thoroughly described in the literature pertaining to air navigation, as part of the standard CAA approved omni-directional beacon system.

Figure 5:
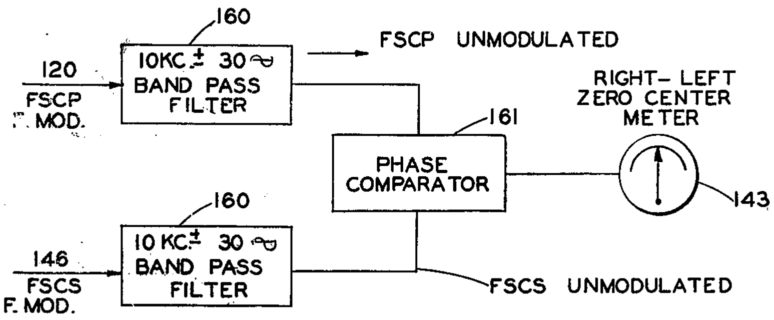
Figure 5 is a functional block diagram of a phase comparison system for range in accordance with the present invention.

In Figure 5 is illustrated a phase comparison system which has for its ultimate purpose the provision of range information. For this purpose, as has been hereinbefore fully explained, it suffices to compare the phase of the signal Fsc as transmitted with the phase of that same signal as received after being transponded. There is accordingly supplied to the system 140 a signal Fscs deriving from generator 54 (Fig. 2), and applied over a lead 146, which represents the signal as transmitted, and a further signal Fscp, which is applied over lead 129, which is applied over lead 129 and is derived from the I. F. amplifier 123. The signal Fscs may be considered to be of standard or reference phase, whereas the phase of the signal Fscp is a function of distance or range.

A difficulty, which has been before alluded to, arises here, in that the signals Fscs and Fscp are frequency modulated and hence have no constant phase which may be measured. This difficulty is eliminated by eliminating from the signals Fscs and Fscp the frequency modulation inherent thereon, and this may be simply accomplished by passing the signals through filters 160 of very narrow pass-band, i. e. less than ±60 cycles. Since the frequency modulated signals Fscs and Fscp may each be considered to be made up of a carrier of unvarying frequency, plus a series of sidebands spaced from the carrier by increments of 60 cycles, the modulation frequency of the carriers, this step provides signal of pure unvarying sine character, which are readily adaptable to phase comparison.

The outputs of the filters 160 may be applied to a suitable phase comparator 161, of the same nature as comparator 154 (Figure 4) and the output signal indicated on a meter 143, similar to meter 144, but which may be suitably calibrated in miles, or thousands of yards, or the like.

The individual channel for range, bearing and voice which I have denoted I. C. is of course adequate for providing information only with respect to a single aircraft. The present system may be required to provide similar information concerning a considerable number of aircraft, and to accomplish this function I provide a plurality of cathode followers 170, or other isolating amplifiers, coupled in parallel to the output of I. F. amplifier 120. To the output of each isolating amplifier 170 may be coupled a complete channel I. C. similar to that illustrated, and each being tunable selectively to enable reception on a given altitude frequency, and hence from a selected aircraft.

In order to assure that any specific I. C. channel is in tune with a selected aircraft, or in tune to a selected altitude representative frequency, the output of the oscillator 122, which is variable over the frequency band 5–6 mc., and tuning of which serves to select the frequency of the associated I. C. channel, is applied to a mixer 180, to which is also applied the output of a fixed frequency oscillator 181, which supplies a frequency of exactly 1 mc. The output of the mixer 180 then comprises a single fixed frequency selectable in the range 6–7 mc. by tuning the oscillator 122. The output of the mixer 180 may be applied over a circuit maker and breaker 182 to the input of mixer 85, where it is treated exactly as an altitude representative frequency and is applied to the recorder FAX and to the indicator 100, for comparison with actual altitude representative signals.

If then, we assume that an aircraft at altitude 6000 ft. is to be selected for observation and placed in communication with a selected channel I. C. the switch 182 associated with that channel is closed and the oscillator 180 manually tuned until the pip produced thereby on the indicator 100, and the mark produced thereby on the record receiving surface 92 coincide with the pip and the mark due to the aircraft at 6000 ft. The switch 182 may then be opened, and manual control of the oscillator 122 surrendered to the automatic frequency control elements 127 and 128.

While the above description has been confined to a system of range determination which utilizes the carrier of the signal *fsc*, at 10,000 cycles per second, for range determination, this obviously is not essential to the present system. In fact, for many purposes it is far from an ideal choice, having primarily the merit that the signay *fsc* is inherently available in the C. A. A. omni-directional beacon system, as at present formulated. Utilization of a lower frequency than 10 kc. for range determination enables an increased range to be measured without ambiguity. For example, if a frequency of 5 kc. is utilized, range may be measured to about 20 miles, and if a frequency of 3 kc. is utilized, to more than 30 miles.

Further, the use of a 10 kc. frequency modulated signal requires the use of filters of high Q, to remove from the 10 kc. carrier its sidebands due to modulation. The use of such filters introduces the possibility of phasing errors due to frequency drift of the filters.

I therefore conceive it to be desirable, if not preferable, to introduce into the beacon transmitter of Figure 2, a source of 3 kc. signal which may be imposed on the 120 mc. carrier as an amplitude modulation, and which may be transponded by the airborne transponders of Figure 1, and detected and compared in phase with a signal of standard phase for range determination, at the ground station, in accordance with the disclosure and techniques described hereinbefore.

The use of such a signal requires that no speech frequencies at or adjacent the 3,000 cycle signal be permitted anywhere in the system, which may readily be accomplished by means of suitable filters. So filter 21 (Figure 1) must cut off at 2500 cycles instead of at 4000 cycles, and detector 7 (Figure 1) must be provided with a single frequency rejection filter tuned to 3 kc. to delete 3 kc. tone from reproducer 8.

In Figure 2 the microphone 61 may cut off at 2500 cycles.

In Figure 3 the amplifier 125 may cut off at 2500 cycles, and the filter 130 must be tuned to 3 kc., and in Figure 5 the filters 160 will be unnecessary and may be omitted, but if used must be tuned to 3 kc., and may be relatively broad band, to avoid the possibility that phase shifts will be introduced thereby.

I consider the above described modifications to be of relatively obvious character, and that the system utilizing the 10 kc. FM. signal and utilizing the 3 kc. unmodulated signal for range determination, are broadly or generically similar.

While I have described an embodiment of my invention and have suggested certain modifications thereof, it will be clear that further modifications and variations of the system as a whole, as well as of various of its details, may be resorted to without departing from the spirit and true scope of the invention, being such as will readily suggest themselves to those skilled in the pertinent art after my invention and system has been disclosed.

What I claim and desire to secure by Letters Patent of the United States is:

1. In combination, a variable frequency oscillator, means for controlling the frequency of said oscillator in accordance with the value of a telemetric quantity, a source of master frequency, means for combining the frequency of said source and of said oscillator to provide a further frequency representative of the value of said telemetric quantity, means for detecting the value of said telemetric quantity and including a superheterodyne receiver, and means for supplying said master frequency to said superheterodyne receiver for heterodyning with received signals, whereby said means for detecting is independent of variations of said master frequency.

2. In combination, a plurality of independent variable frequency oscillators, a source of stable signal frequency, means for separately combining said signal frequency and signals derived from each of said oscillators to provide a plurality of variable frequency signals, means for transmitting said variable frequency signals, means for controlling the frequency of each of said plurality of independent variable frequency oscillators in accordance with the value of a telemetric quantity, and means for receiving and analyzing said variable frequency signals to determine values of said telemetric quantities, said last means comprising a superheterodyne receiver, and means for supplying said master frequency to said superheterodyne receiver for heterodyning with said variable frequency signals, whereby drifts of frequency of said source of signal frequency affects equally the determination of all values of said telemetric quantity.

3. In combination, a beacon transmitter providing an alternating current signal having a phase of different value for each azimuthal bearing angle from said transmitter, means located remotely of said beacon transmitter for repeating signals derived from said beacon transmitter, the value of said phase being retained in repeating, and means remote from said means for repeating for receiving said repeated signals and for deriving therefrom information concerning the azimuthal bearing angle of said means for repeating.

4. The combination in accordance with claim 3 wherein said beacon transmitter provides an omni-directional transmission at a fixed carrier frequency and having one modulation at fixed phase omni-directionally and another modulation having a phase which varies in accordance with the direction from which the transmitter is viewed.

5. The combination in accordance with claim 3 wherein said means for repeating comprises a heterodyning circuit for translating the repeated frequency, and wherein means are provided for controlling the said heterodyning circuit for providing repeated signals at a frequency determined in accordance with a value of a measurable quantity.

6. In combination, means for transmitting a radio frequency signal having a modulation impressed thereon, means for repeating said signal including said modulation from a location remote from said means for transmitting to provide a repeated signal, said means for repeating including means for translating the frequency of said repeated signal to a new frequency having a numerical value representative of the value of a measurable quantity, means remote from said means for receiving said repeated signal and said radio frequency signal and for deriving from said repeated signal and said radio frequency signal the value of said measurable quantity, said means for receiving including means for comparing said modulation as transmitted by said means for transmitting with said modulation as received by said means for receiving to derive a measurement of range of said means for repeating.

7. In combination, an omni-directional beacon for transmitting an omni-directional carrier modulated with a sub-carrier which is in turn modulated with a first fixed frequency and for transmitting a directional beam of radiant energy rotating at the said fixed frequency a repeater located remotely of said beacon for receiving signals derived therefrom and for re-transmitting a further carrier modulated with said modulated sub-carrier and with a modulation derived from rotation of said directional beam of radiant energy, means for adjusting the frequency of said re-transmitted carrier to a frequency value corresponding with the value of a telemetric quantity, and means for receiving said re-transmitted carrier and for interpreting the carrier frequency of said first mentioned carrier and the modulations of said re-transmitted carrier as received by said means for receiving in terms of a value of said telemetric quantity, a range, and a bearing.

8. In combination, an omnidirectional range radio beacon transmitter for transmitting a carrier and a first modulation of said carrier and a second modulation of said carrier, airborne means for receiving said carrier and for converting said carrier to a further carrier having a frequency determined in accordance with the altitude of said airborne means and for re-transmitting said further carrier modulated by said first and second modulations, a receiver located remotely of said airborne means for receiving said further carrier, and means responsive to said receiver for analyzing said further carrier and its modulations in terms of a range, an altitude and a bearing of said airborne means.

9. In combination, ground located means for transmitting signal at a first carrier frequency, means located aboard an aircraft for receiving said signals, means aboard said aircraft for measuring the altitude of said aircraft, means responsive to said last named means and to reception of signals by said means for receiving for transmitting from said aircraft a further signal having a frequency corresponding with altitude of said aircraft, a ground receiver for said further signal, and means for controlling said ground receiver to receive only said further signals having carrier frequencies falling within a predetermined relatively narrow band of frequencies corresponding with a relatively narrow range of altitudes, said receiver comprising means for heterodyning the frequency of said further signals with the frequency of said first carrier frequency.

10. In combination, ground located means for transmitting signal at a first carrier frequency, means located aboard an aircraft for receiving said signals, means aboard said aircraft and responsive to said signals for transmitting a further signal having a further carrier frequency representative of altitude of said aircraft, a predetermined range of further carrier frequencies represented a predetermined range of altitudes, a ground receiver for said further carrier frequencies, said ground receiver having means for receiving selectively only predetermined ones of said further carrier frequencies representative of a predetermined portion of said range of altitudes, said ground receiver comprising means for heterodyning the frequency of said first carrier with the frequency of said further carrier.

11. In combination, a variable frequency oscillator mounted on an aircraft, means for controlling the frequency of said oscillator in accordance with the altitude of said aircraft, a source of master frequency, means aboard said aircraft for receiving said master frequency and for combining the frequency of said source and said master frequency to provide a further frequency representative of the altitude of said aircraft, remote means for receiving and detecting said further frequency and comprising heterodyne means, and means for supplying said master frequency to said heterodyne means for heterodyning with said further frequency.

12. In combination, a variable frequency oscillator mounted on an aircraft, means for controlling the frequency of said oscillator in accordance with the altitude of said aircraft, a source of master frequency, means aboard said aircraft for receiving said master frequency and for combining the frequency of said source and said master frequency to provide a further frequency representative of the altitude of said aircraft, remote means for receiving and detecting said further frequency and comprising heterodyne means, and means for supplying said master frequency to said heterodyne receiver for heterodyning with said further frequency, said remote means for receiving comprising means for receiving only selected values of said further frequency.

13. In combination, a plurality of independent variable frequency oscillators, each aboard a different aircraft, a single source of signal frequency, means aboard each of said aircraft for receiving said signal frequency and for combining said variable frequency with said signal frequency to provide a heterodyne frequency, means for transmitting said heterodyne frequencies, means aboard each of said aircraft for controlling the frequency of its variable frequency oscillator in accordance with its altitude, and means for selectively receiving said heterodyne frequencies to derive altitude information therefrom, said means for selectively receiving comprising a superheterodyne receiver, said superheterodyne receiver comprising means for heterodyning said heterodyne frequencies with said signal frequency.

14. The combination in accordance with claim 1 wherein said source of master frequency is an omni-directional range radio transmitter.

15. In combination, an omni-directional beacon for transmitting an omni-directional carrier modulated by a first alternating current signal which is of equal phase omni-directionally and a second alternating current signal which has a phase at each bearing from said transmitter which is representative of said each bearing, a repeater located remotely of said beacon for receiving said omni-directional carrier and for re-transmitting a carrier modulated with said first and second alternating current signals, means for receiving said re-transmitted carrier and for deriving said first and second alternating current signals therefrom, and means responsive to said first and second alternating current signals for providing an indication of bearing and range of said repeater from said transmitter.

16. The combination in accordance with claim 7 wherein said telemetric quantity is altitude of said repeater.

MARCEL WALLACE.

REFERENCES CITED

The following references are of record in the file of this patent:

UNITED STATES PATENTS

| Number | Name | Date |
|---|---|---|
| 2,039,404 | Green et al. | May 5, 1936 |
| 2,039,405 | Green et al. | May 5, 1936 |
| 2,090,359 | Robinson | Aug. 17, 1937 |
| 2,252,083 | Luck | Aug. 12, 1941 |
| 2,253,958 | Luck | Aug. 26, 1941 |
| 2,403,728 | Loughren | July 9, 1946 |
| 2,406,953 | Lewis | Sept. 3, 1946 |
| 2,421,017 | Deloraine | May 27, 1947 |
| 2,437,242 | Cole et al. | Mar. 9, 1948 |
| 2,444,452 | Labin | July 6, 1948 |
| 2,468,045 | Deloraine | Apr. 26, 1949 |
| 2,535,038 | Busignies | Dec. 26, 1950 |